INVENTOR
EDGAR PHILLIPS PEREGRINE
BY Sawyer & Kennedy
ATTORNEYS

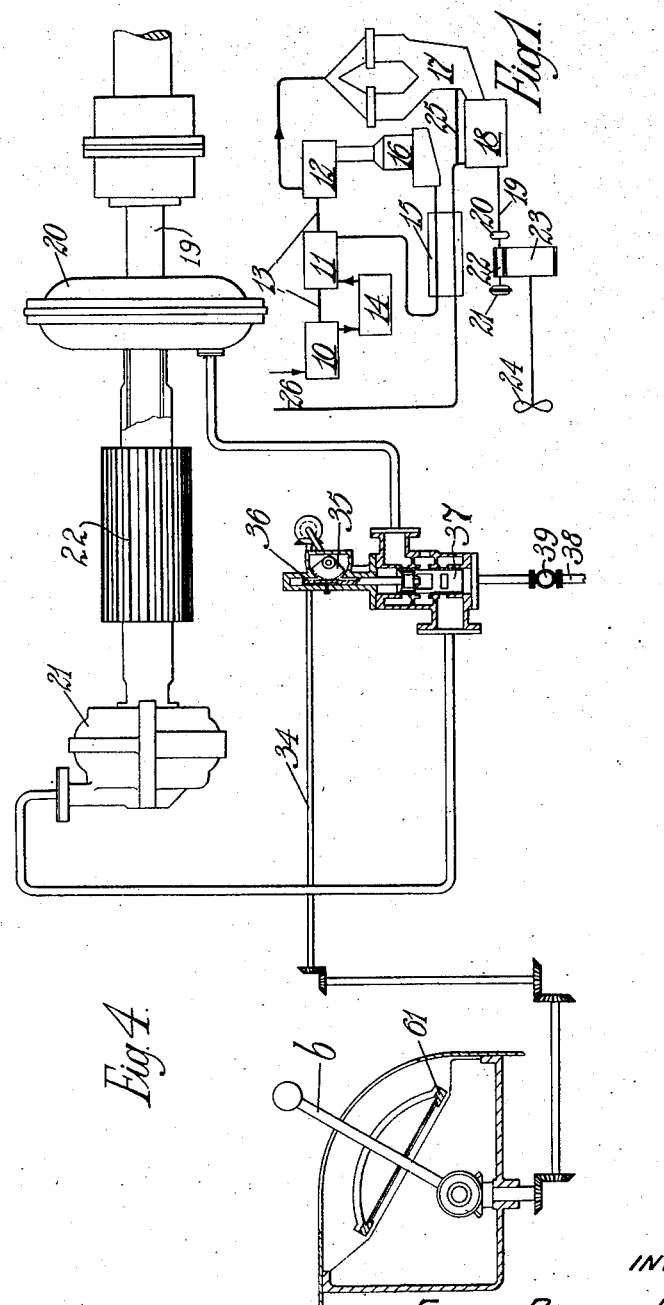

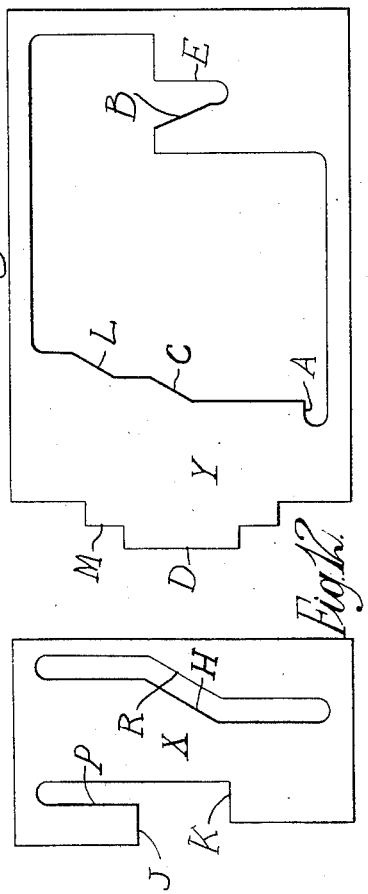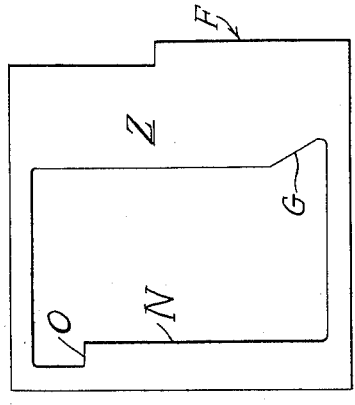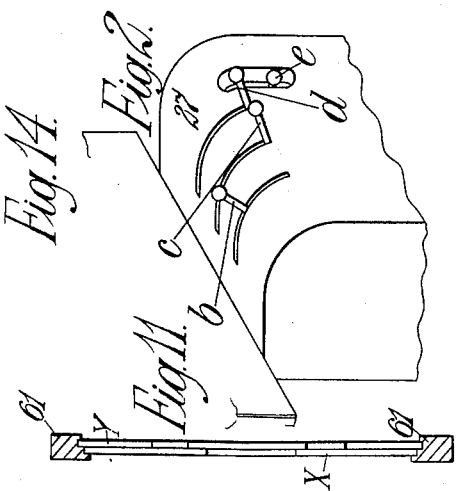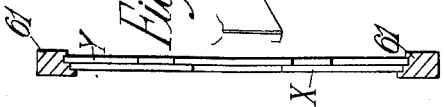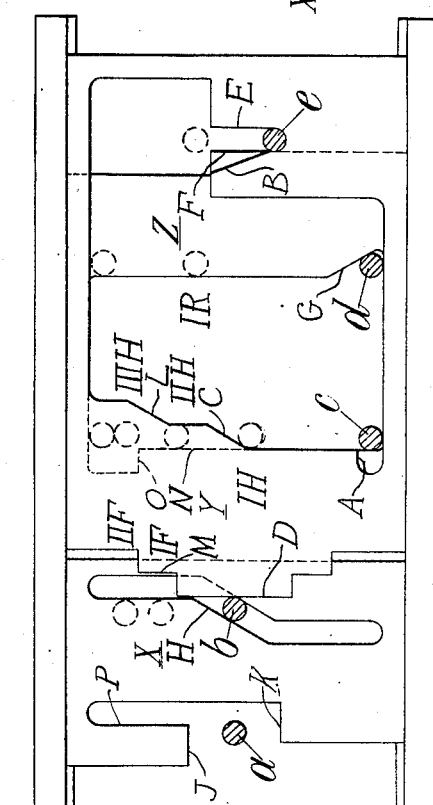

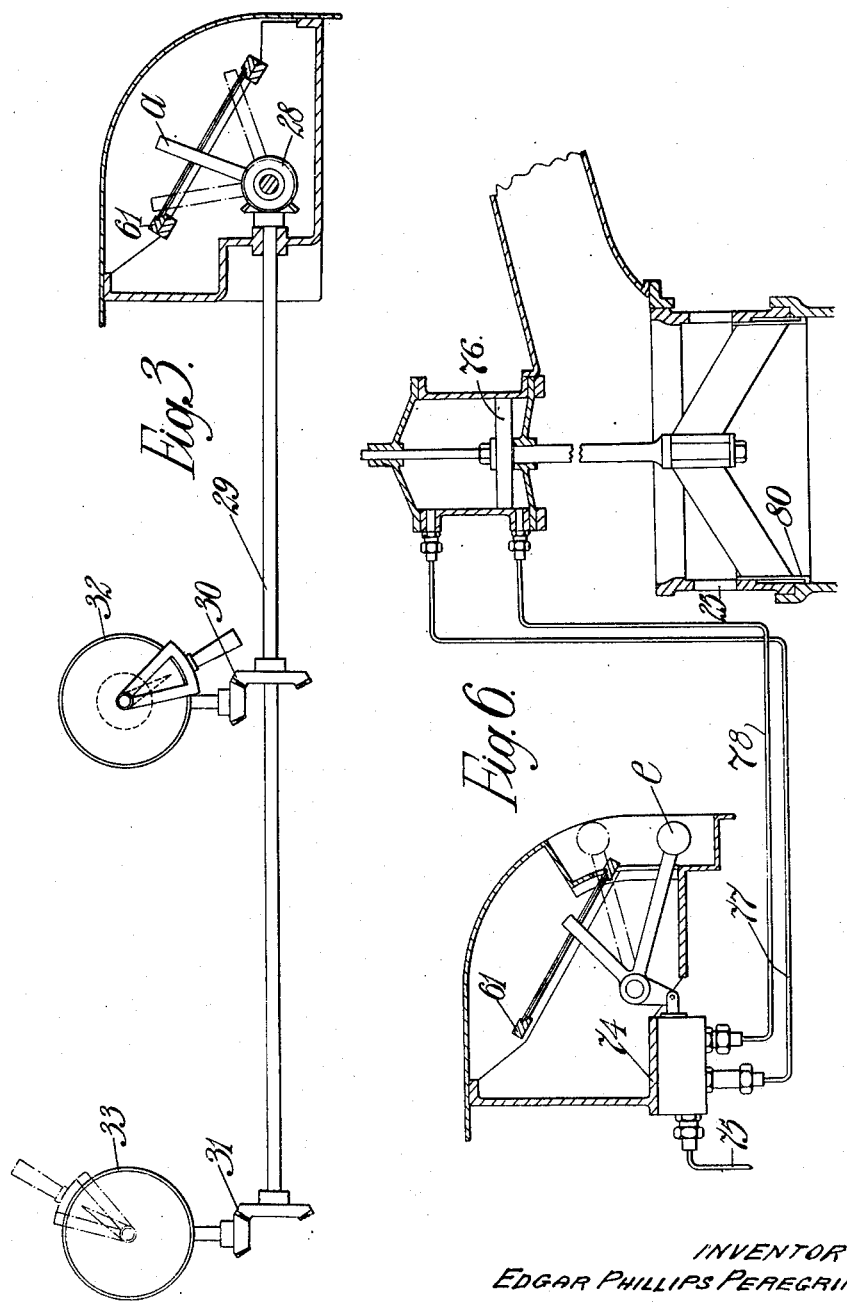

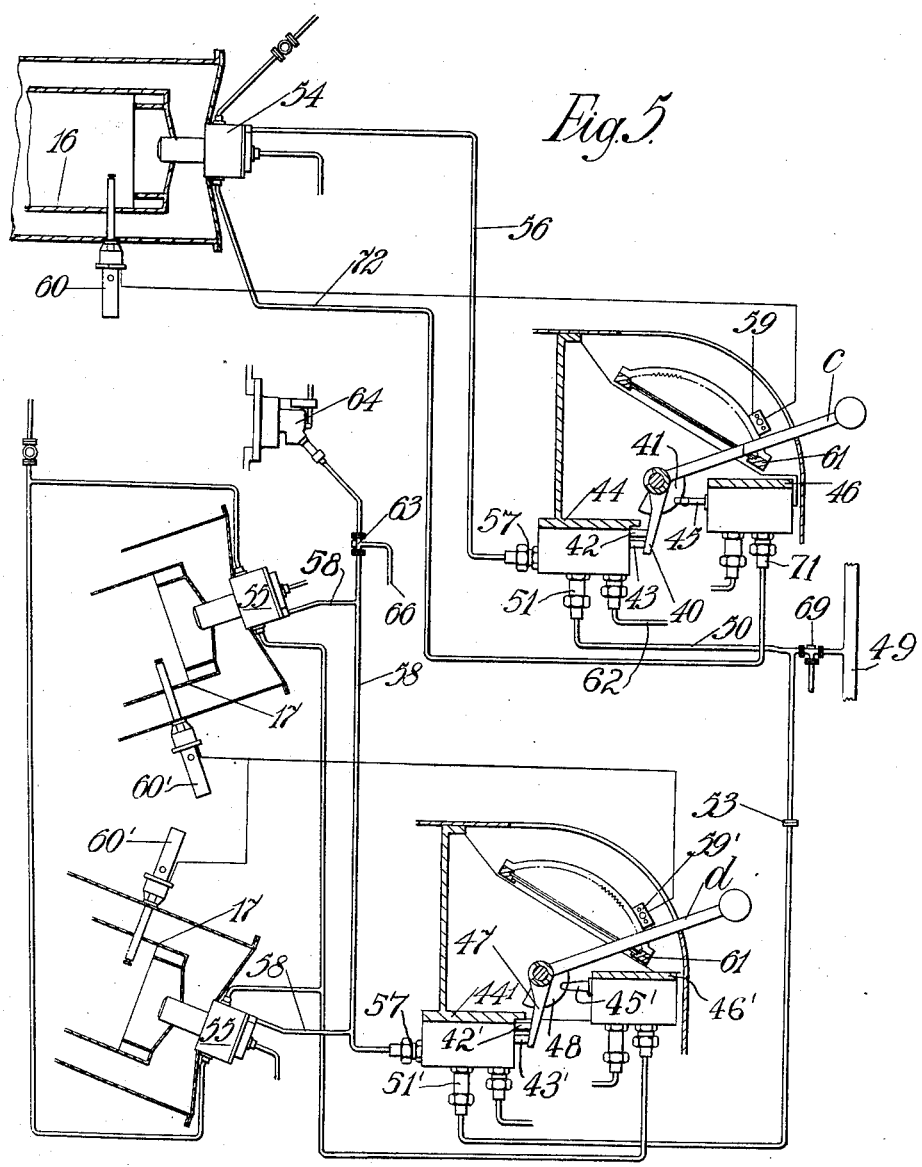

Patented July 29, 1952

2,604,797

UNITED STATES PATENT OFFICE 2,604,797

CONTROL OF GAS TURBINES

Edgar Phillips Peregrine, Tynemouth, England, assignor to The Parsons and Marine Engineering Turbine Research and Development Association, Wallsend, England Application August 9, 1947, Serial No. 767,699
In Great Britain November 1, 1946

5 Claims. (Cl. 74—483)

This invention relates to the control of gas turbines and has for its object to provide systems of control affording protection against unintentional misuse or accident.

The present invention consists in control devices for gas turbines having features as set out in the claims appended hereto.

Referring to the accompanying diagrammatic drawings:

Figure 1 is a diagram illustrating a typical gas turbine plant lay-out to which the present invention may be applied.

Figure 2 is a perspective view of part of a mechanical interlocking system embodying the present invention.

Figures 3 to 6 illustrate details of the said system.

Figure 10 is an enlarged plan view of the interlocking plates.

Figure 11 is an end view thereof, and

Figures 12 to 14 are plan views of the individual interlocking plates.

Figure 7:
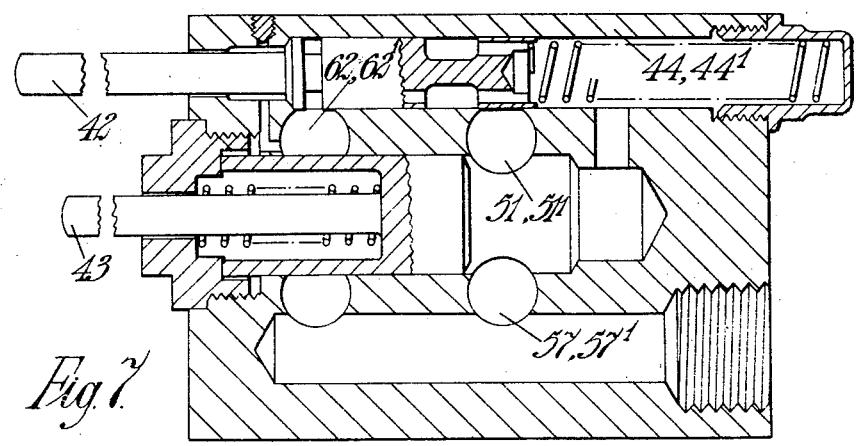
Figures 7 to 9 illustrate enlarged sectional views of the control blocks of Figures 5 and 6.

In carrying the invention into effect according to one form by way of example as applied to a ship's propulsion plant illustrated in Figure 1, mechanical interlocking mechanism illustrated in Figures 2 to 14 is provided.

In Figure 1 a low pressure air compressor 10, a high pressure air compressor 11 and a high pressure gas turbine 12 are mounted on a common shaft 13, an intercooler 14 being provided between the compressors 10 and 11.

Compressed air from the H. P. compressor 11 is conveyed by way of a heat exchanger 15 to a high pressure combustion chamber 16 which is connected to the H. P. turbine 12 and the exhaust from the latter is led by way of two reheat combustion chambers 17, 17 to a low pressure turbine 18, the shaft 19 of which is connected by way of ahead and astern hydraulic couplings 20, 21 to a primary pinion 22 meshing with a toothed gear wheel 23 coupled to a propeller 24. A by-pass connection 25 is provided to the exhaust of the L. P. turbine which is led in counter-current flow through the heat exchanger 15 to the ship's funnel 26.

Mechanical interlocking control mechanism 27 (Figure 2) incorporating four external levers $b$, $c$, $d$, and $e$ and an internal lever $a$ is provided in the engine room.

The lever $a$ (Figure 3) is connected by bevel gearing 28 to a shaft 29 which in turn is connected by gearing 30, 31, to an engine room telegraph 32 and a bridge telegraph 33.

The lever $b$ (Figure 4) is connected by gearing and a shaft 34 to a toothed sector 35 engaging a toothed rack on a valve spindle 36. The valve 37 incorporates ports whereby lubricating oil supplied to a pipe 38 from a pump (not shown) may be admitted by way of a master valve 39 alternatively to the ahead coupling 20 or the astern coupling 21.

Figure 8:
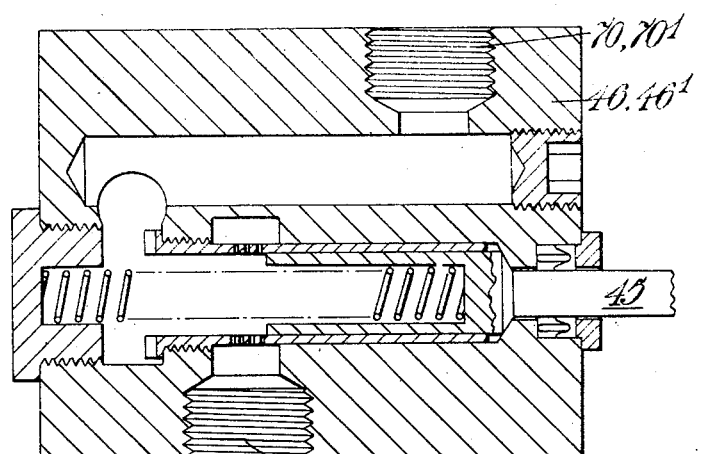
Figure 9:
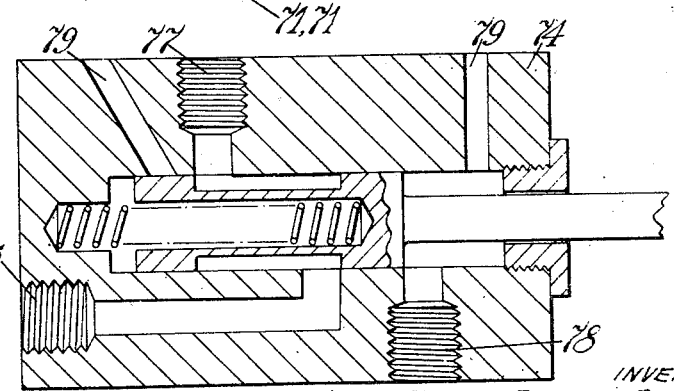

The lever $c$ is attached to an arm 40 and a cam 41, the arm 40 co-acting with a pair of plungers 42, 43 in a block 44 (Figure 7) and the cam co-acting with a plunger 45 in a block 46 (Figure 8).

The lever $d$ is attached to an arm 47 and a cam 48, the arm 47 co-acting with similar plungers 42', 43' in a similar block to that shown in Figure 7 and the cam co-acting with a similar plunger 45' in a similar block to that shown in Figure 8.

As regards the block 44 (Figures 5 and 7) lubricating oil is admitted to a pipe 49 and passes by way of a pipe 50 directly to an oil inlet port 51 in the block.

Oil from the said block 44 is conveyed by way of an outlet port 57 to a fuel oil sprayer 54 associated with the H. P. combustion chamber 16 by way of a pipe 56.

As regards the block 44' (Figures 5 and 7) oil is conveyed to the outlet port 51' by way of an orifice plate 53 and passes from the oil outlet port 57 to fuel oil sprayers 55, 55 associated with the reheat combustion chambers 17, 17 by way of pipes 58, 58.

Oil drain outlet ports are provided at 62, 62'. One of the pipes 58 leads also by way of a valve 63 operated thermostatically from the inlet duct of the L. P. turbine 18 to an overspeed trip device 64 the outlet pipe 65 from which leads to a lubricating oil drain tank (not shown). A further valve 69 is also thermostatically operated from the inlet duct of the H. P. turbine 12. A pipe 66, pipes 67, 67', pipe 68, and the ports 62, 62' also lead to said tank.

As regards the blocks 46, 46' (Figures 5 and 8) the outlets 70, 70, are connected to the oil fuel suction line whilst the inlets 71, 71' receive the fuel oil spilled by the sprayers, 54 and 55, through pipes 72, 73.

As regards the block 74 (Figures 6 and 9) air is admitted through 75 from the H. P. compressor 11 and passes to the upper or lower sides of a piston 76 through 77 or 78 respectively, leak-off openings being provided at 79 to atmosphere.

The piston 76 serves to actuate a by-pass valve 80 (Figure 6) serving to open or close the passage 25 (Figure 1).

Switches 59, 59' are provided adjacent to the levers $c$, $d$ respectively for controlling the circuits of electrically actuated igniters 60, 60'.

Three interlocking sliding plates X, Y, and Z (Figures 10-14) are provided carried in a frame 61, the plates X and Z lying in one plane and the plate Y lying in a parallel plane above the plates X and Z.

In Figure 10 the levers a, b, c, d and e are in positions they occupy when the plant is in shut-down condition. The plate Y is urged to the right and the plate Z is urged to the left in Figure 10 by springs (not shown).

The sequence of operations entailed during starting of the plant, driving the propeller with full output and subsequently shutting down are set out in the table below:

*Sequence of lever movements in starting and stopping engine*

| Operation or order | Position of Levers ||||| Function of Interlocks |
|---|---|---|---|---|---|---|
| | a | b | c | d | e | |
| Engine stopped and closed down | Stop | Stop | Stop | Stop | Shut | Plate Y moves to the right of the position shown in Figure 10 under the action of spring and locks lever c at AY. |
| Starting Up: | | | | | | |
| (1) Open bypass valve | ___do___ | ___do___ | ___do___ | ___do___ | Open | Lever e moving along BY pushes Y to left and frees AY permitting operation of lever c (position shown in Figure 10). |
| (2) Light up H. P. combustion chamber and idle. | ___do___ | ___do___ | Idle | ___do___ | ___do___ | With lever at b at stop both ahead and astern couplings are partly energised so that any power developed by the output turbine is absorbed by the astern coupling and is not transmitted to propeller shaft. |
| (3) Increase H. P. chamber to $I_H$. | ___do___ | ___do___ | $I_H$ | ___do___ | ___do___ | Further movement of c is prevented by cam CY being locked by DY and EY. |
| (4) Shut bypass valve | ___do___ | ___do___ | $I_H$ | ___do___ | Shut | This frees EY (and FZ which locks lever d against cam GZ). Engine is now developing maximum power with no revolutions on main shaft. |
| On Receipt Of Ahead Order: | | | | | | |
| (1) Flood ahead coupling to $I_F$. | ___do___ | $I_F$ | $I_H$ | ___do___ | ___do___ | Lever b moving along HX frees JX and permits telegraph to signal ahead movement. Face DY is now freed permitting lever c to operate to position $II_H$. |
| (2) Reply ahead on telegraph | Ahead | $I_F$ | $I_H$ | ___do___ | ___do___ | Astern signals on telegraph are prevented by KX. |
| (3) Increase H. P. chamber output to $II_H$. | ___do___ | $I_F$ | $II_H$ | ___do___ | ___do___ | Further movement of c is prevented by cam LY being locked by MY. |
| (4) Increase fluid to ahead coupling to $II_F$. | ___do___ | $II_F$ | $II_H$ | ___do___ | ___do___ | This frees MY and lever c may now be operated to full output. |
| (5) Increase H. P. chamber output to $III_H$. | ___do___ | $II_F$ | $III_H$ | ___do___ | ___do___ | This frees NZ which has been locking lever d against cam GZ. |
| (6) Light up reheat chamber and load to required output. | ___do___ | $II_F$ | $III_H$ | $I_R$ | ___do___ | Engine is now free to operate at full output. |
| On Receipt of "Stop": | | | | | | |
| (1) Shut down reheat chamber. | ___do___ | $II_F$ | $III_H$ | Stop | ___do___ | Z moves to left under action of spring. This frees OZ and allows lever c to be closed. |
| (2) Reduce H. P. chamber output to $I_H$. | ___do___ | $II_F$ | $I_H$ | ___do___ | ___do___ | Y moves to right under action of spring and frees lever b from Y. |
| (3) Move telegraph to stop | Stop | $II_F$ | $I_H$ | ___do___ | ___do___ | Frees PX. |
| (4) Move fluid to coupling lever to stop. | ___do___ | Stop | $I_H$ | ___do___ | ___do___ | X moves to right under action of cam RX and locks telegraph. |
| (5) Open bypass valve | ___do___ | ___do___ | $I_H$ to idle. | ___do___ | Open | Engine is running idle. |
| To Shut Down Engine: | | | | | | |
| Shut down H. P. combustion chamber, and shut bypass valve. | ___do___ | ___do___ | Stop | ___do___ | Shut | Plate Y moves to right under action of spring and locks lever c at AY. |

In above table the letters A to P refer to faces on the plates X, Y, Z, e. g. AY refers to face A on plate Y.

What is claimed is:

1. In a control system for gas turbines in combination, a plurality of levers constrained to pivot in parallel planes containing the individual levers, a plurality of mutually slidable interlocking plates each furnished with apertures through which certain of said levers pass, fixed guides for said plates and a plurality of abutment surfaces within said apertures co-acting directly with certain of said levers.

2. In a control system for gas turbines in combination, a plurality of levers constrained to pivot in parallel planes containing the individual levers, an apertured slidable plate, guides therefor, a pair of further apertured plates carried by said guides and disposed in a common plane beneath the plane containing the first-mentioned plate, said plurality of levers passing through the apertures in said plates and a plurality of abutment surfaces in said apertures co-acting directly with certain of said levers.

3. In a control device for gas turbines in combination, a plurality of levers constrained to pivot in parallel planes containing the individual levers, a plurality of mutually slidable interlocking plates each furnished with apertures through which said levers pass, interlocking means associated with at least two of said levers, said interlocking means co-acting directly with one of said levers to lock it in one or other of at least three individual positions in dependence upon the prevailing position of said interlocking means.

4. In a control device for gas turbines in combination four pivoted levers, three mutually slidable interlocking plates each furnished with apertures through which certain of said levers pass, fixed guides for said plates and a plurality of abutment surfaces within said apertures co-acting directly with certain of said levers.

5. A control device as claimed in claim 4 wherein said apertures embody surfaces inclined to a plane at right angles to the pivot axis of the levers whereby manual movement of the levers effects lateral movement of the said plates.

EDGAR PHILLIPS PEREGRINE.

REFERENCES CITED

The following references are of record in the file of this patent:

UNITED STATES PATENTS

| Number | Name | Date |
|---|---|---|
| 601,757 | Owen | Apr. 5, 1898 |
| 823,522 | Gramm | June 19, 1906 |
| 1,638,429 | Allard | Aug. 9, 1927 |
| 1,956,751 | Zawadzki | May 1, 1934 |
| 2,040,388 | Kruger | May 12, 1936 |
| 2,358,643 | Kelley | Sept. 19, 1944 |

FOREIGN PATENTS

| Number | Country | Date |
|---|---|---|
| 127,527 | Great Britain | June 5, 1919 |